United States Patent
Davis et al.

(10) Patent No.: US 7,651,110 B2
(45) Date of Patent: Jan. 26, 2010

(54) BICYCLE HAVING MULTIPLE TUBE FRAME STRUCTURE

(75) Inventors: Stephen J. Davis, Newtown, PA (US); Roberto Gazzara, Mestre (IT); Mauro Pezzato, Treviso (IT); Mauro Pinaffo, Camposampiero (IT); Michele Pozzobon, Fossalunga di Vedelago (IT)

(73) Assignee: Prince Sports, Inc., Bordentown, NJ (US)

( * ) Notice: Subject to any disclaimer, the term of this patent is extended or adjusted under 35 U.S.C. 154(b) by 167 days.

(21) Appl. No.: 11/636,314

(22) Filed: Dec. 8, 2006

(65) Prior Publication Data
US 2007/0222178 A1 Sep. 27, 2007

(30) Foreign Application Priority Data
Dec. 9, 2005 (EP) .................................. 05111892

(51) Int. Cl.
*B62K 1/00* (2006.01)
(52) U.S. Cl. .................................... 280/281.1; 280/274
(58) Field of Classification Search .............. 280/281.1, 280/274
See application file for complete search history.

(56) References Cited

U.S. PATENT DOCUMENTS

| | | | | |
|---|---|---|---|---|
| 422,548 | A | * | 3/1890 | Thomas ...................... 280/251 |
| 2,330,560 | A | * | 9/1943 | Descos ....................... 280/274 |
| 4,657,795 | A | | 4/1987 | Foret |
| 4,828,285 | A | | 5/1989 | Foret |
| 4,850,607 | A | | 7/1989 | Trimble |
| 5,059,057 | A | | 10/1991 | Graef |
| 5,116,071 | A | | 5/1992 | Calfee |
| 5,188,384 | A | * | 2/1993 | van Raemdonck ....... 280/281.1 |
| 5,557,982 | A | | 9/1996 | Voss et al. |
| 5,624,519 | A | | 4/1997 | Nelson et al. |
| 5,692,764 | A | | 12/1997 | Klein et al. |
| 5,944,932 | A | | 8/1999 | Klein et al. |
| 6,213,488 | B1 | | 4/2001 | Filice et al. |
| 6,270,104 | B1 | | 8/2001 | Nelson et al. |
| 6,431,574 | B1 | | 8/2002 | Gueugneaud |
| 6,655,707 | B2 | | 12/2003 | Buckmiller et al. |
| 6,669,218 | B1 | | 12/2003 | Sinyard et al. |
| 6,848,701 | B2 | | 2/2005 | Sinyard et al. |
| 7,147,237 | B2 | | 12/2006 | Cobb |
| 2003/0094067 | A1 | | 5/2003 | Whiting et al. |
| 2005/0153799 | A1 | | 7/2005 | Rigoli |
| 2006/0172828 | A1 | | 8/2006 | Pezzato et al. |

FOREIGN PATENT DOCUMENTS

| | | |
|---|---|---|
| DE | 899761 | 12/1953 |
| DE | 19640955 | 4/1998 |
| DE | 29823882 | 1/2000 |
| DE | 20317668 | 4/2004 |

OTHER PUBLICATIONS

U.S. Appl. No. 11/509,999, filed Aug. 26, 2006, Stephen J. Davis.

(Continued)

*Primary Examiner*—Tony H. Winner
(74) *Attorney, Agent, or Firm*—Abelman, Frayne & Schwab

(57) ABSTRACT

A structure for a bicycle frame system is described by using multiple composite tubes bonded to one another, wherein apertures, or "ports," are molded between the tubes to improve the stiffness, strength, aerodynamics and comfort of bicycle frame component.

13 Claims, 10 Drawing Sheets

OTHER PUBLICATIONS

U.S. Appl. No. 11/636,294, filed Dec. 8, 2006, Gazzara et al.
U.S. Appl. No. 11/752,574, filed May 23, 2007, Stephen J. Davis.
European Patent Office, Extended European Search Report for EP05111892.5, Mar. 6, 2006.

* cited by examiner

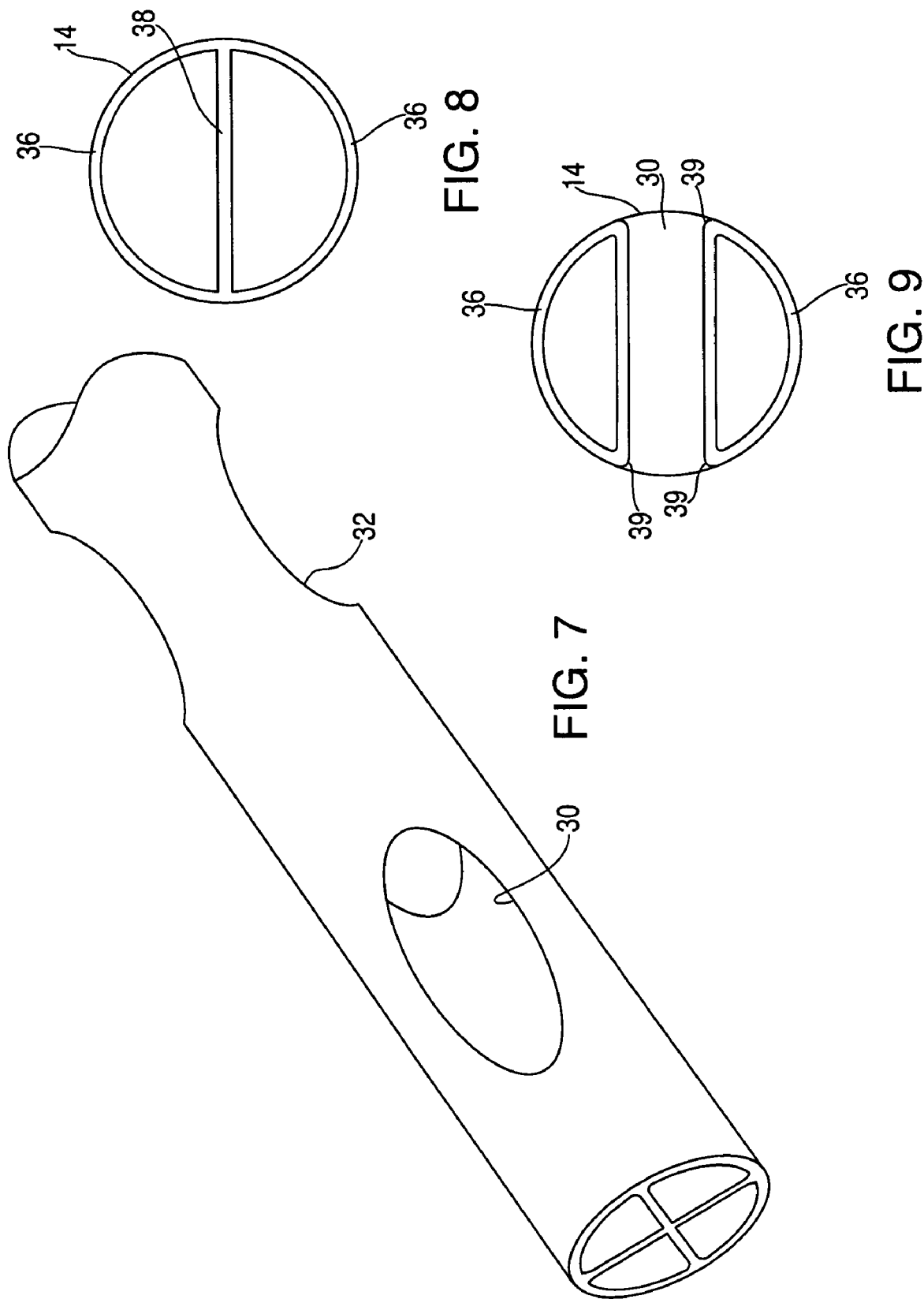

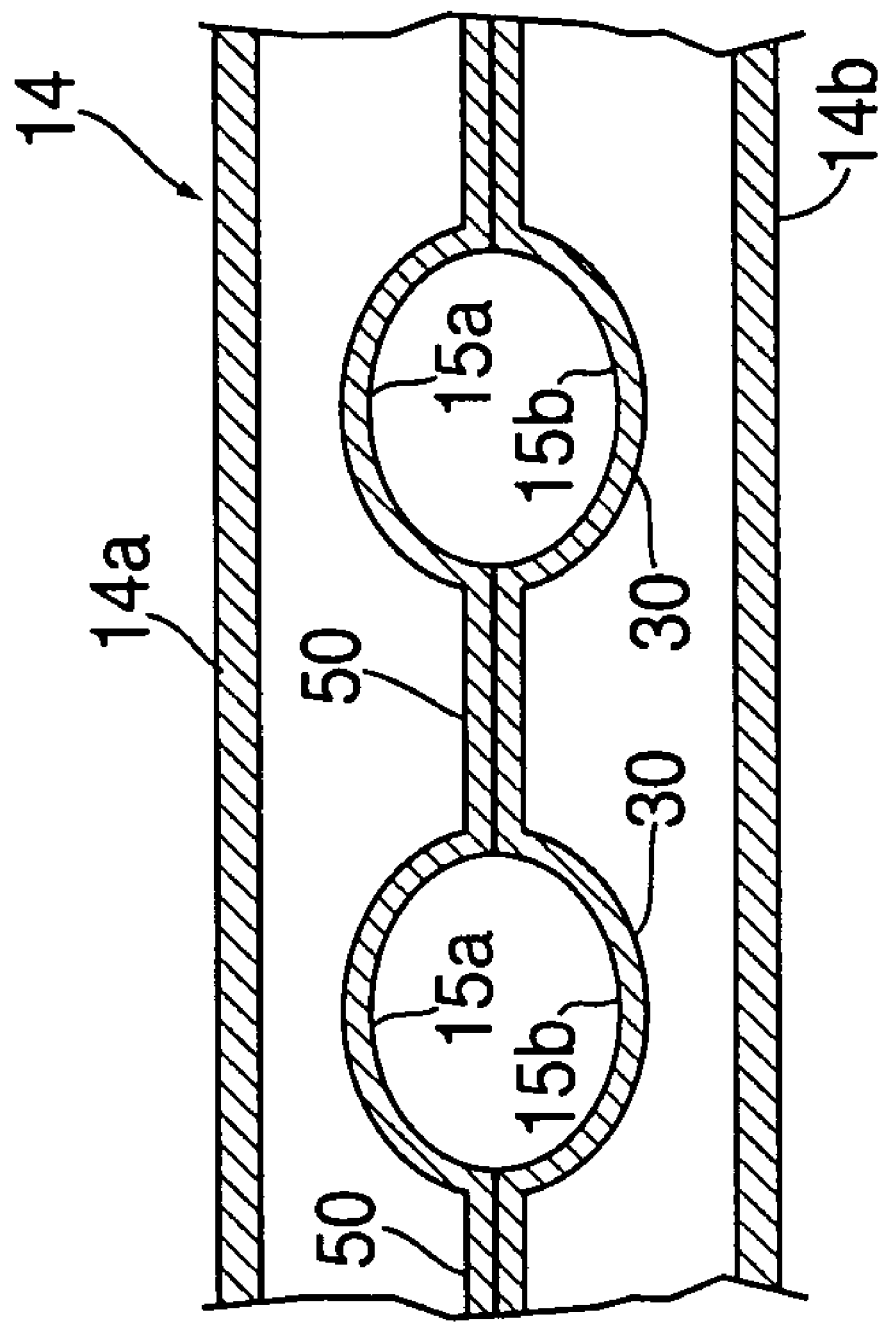

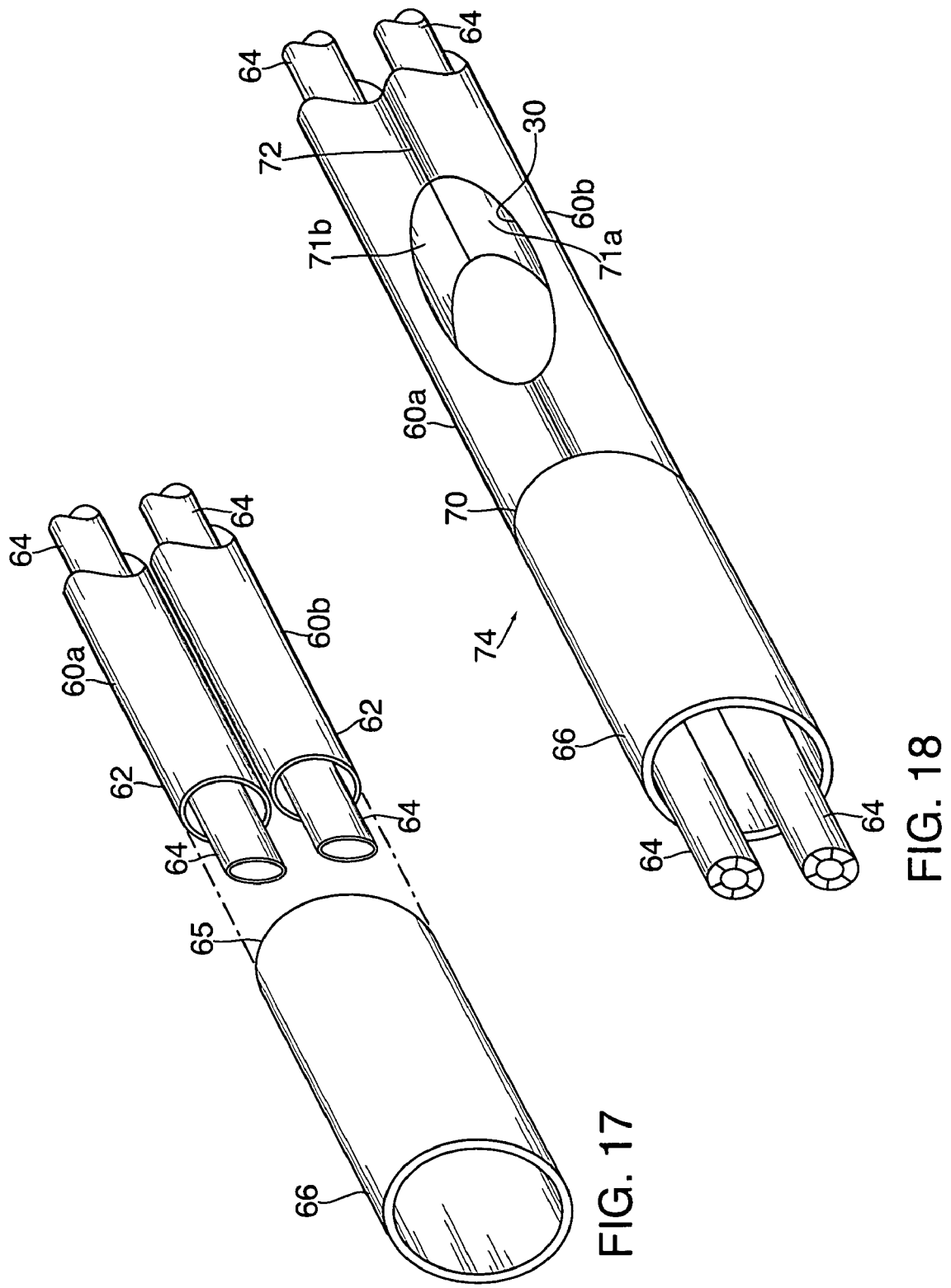

BICYCLE HAVING MULTIPLE TUBE FRAME STRUCTURE

The present invention relates to a composite structure for a bicycle, and more particularly, where the structure is generally tubular and the traditional single tube is replaced with multiple continuous tubes, preferably a pair of tubes fused together along their facing surfaces to provide an internal reinforcing wall as well as apertures, or "ports," between the tubes to provide specific performance advantages.

This invention relates to an improved structure for a bicycle frame including the top tube, down tube, seat stays, chain stays as well as the front wheel supports (forks), handlebars, and seat post. In particular, the basis of the design is to replace a single tube portion with a double tube design while maintaining the same or similar geometric exterior shape of the original single tube design. This provides a structure with an internal wall between the tubes which has strength and stiffness advantages. In addition, the tubes can be separated at various locations to form apertures or ports between the tubes which act as opposing arches which provide additional strength, stiffness and aerodynamic benefits.

The weight of a performance bicycle is a critical feature in determining performance. The lighter the weight, the quicker the bike will accelerate the easier to sustain high speeds, the easier to climb uphill grades as well as being easier to maneuver. Therefore, the lightest materials and designs are used to achieve these performance goals. The most popular high performance material for modern bicycle design is carbon fiber reinforced epoxy resin (CFE) because it has the highest strength to weight ratio of any realistically affordable material. As a result, CFE can produce a very light weight bicycle frame with excellent rigidity as well as provide an aesthetically pleasing shape.

However, there are inherent problems and challenges with carbon fiber based materials used for bicycle structures. A bicycle frame made from carbon fiber composite can be susceptible to catastrophic failure resulting from excessive compressive forces which cause buckling of the thin walled tubes. A composite tubular part in a bicycle frame is subjected to a multitude of stress conditions. There are bending loads in a multitude of directions. There are torsional loads. There are impact loads and vibrational loads. There can be any combination of these loads resulting in a complex stress state.

In addition to light weight and strength, a tailored stiffness of the bicycle frame is highly preferred. This is because it is not always the stiffest frame that is preferred, but a frame that is tuned, where different portions are stiff and others are more resilient, allowing more deflection. For example, sometimes a bicycle frame can be too rigid and have a "dead" feel to a rider. Other frames can be very flexible and have a "springy" feel. There are a multitude of factors such as weight, rigidity, resilience, torsional stiffness and vibration damping among others that contribute to a desirable frame. To date, modifying these characteristics of a traditional composite bicycle frame has been limited to changing the cross sectional dimensions of the tubular parts or selecting different materials or fiber angles.

For example, if more bending stiffness is desired in one direction than another, the cross section of the tubular part can be designed to provide that stiffness. For example, an oval shaped cross section will have much more stiffness in one direction than another. This can have a very desirable effect, for example, in the down tube of the bicycle frame or in the front forks. However, the major disadvantage of an oval shaped cross section is the susceptibility to buckling of the thin wall section along the wide portion of the cross section due to bending in this direction or due to torsional loads which can also wrinkle or buckle this broad thin wall area.

Another desirable feature in a bicycle is aerodynamics. An aerodynamic bicycle frame which has a reduced frontal area to the direction of travel is possible with composite materials, but comes with compromises. Carbon fiber composites offer the designer more options in terms of frame shape in order to reduce aerodynamic drag. For example, the frame tubes or front forks or handle bars can be made thinner to have less frontal area and therefore having less aerodynamic drag. However, this all comes with a price, because the thinner beam is less rigid and weaker because the cross section is reduced. Therefore, to achieve improved aerodynamic performance one must be willing to accept the compromise of reduced stiffness and strength.

Another desirable feature for a bicycle is comfort. Comfort can be broken down into two categories: large deflection and small deflection. Large deflection occurs when riding off road on rough terrain. There are a number of active suspension systems in bicycles today which use a variety of mechanical devices such as springs and shock absorbers, but these are heavy. Small deflections can be attributed to either vibrations transmitting from the surface conditions, or deflection of the bike due to pedaling, climbing or other rider induced loads. Riding on a rough road can transmit undesirable vibrations known as "road buzz" to the rider which cause discomfort. Many experienced riders describe a preferred feel of a bicycle, which is a combination of the rigidity and resilience of the bicycle structural components, e.g. frame, forks, handlebars and seat post as well as their ability to damp vibrations.

The evolution of the modern bicycle over the past twenty years has focused mainly on light weight. For this reason, there have been numerous designs incorporating carbon fiber composites for bicycle frames and components. Some of the original designs utilized the traditional double triangle shaped frame by replacing the metal tubes with composite tubes, such as shown in U.S. Pat. No. 4,657,795 by Foret. With this design, only the tubular parts such as the top tube or the down tube are replaced with lighter weight composite tubes. The metal joints, also known as lugs, remain unchanged and therefore the benefits of the composites are limited.

Bicycle frame design improved by integrating single composite tubes with light weight composite lugs such as with U.S. Pat. No. 5,116,071 by Calfee. With this design, the lugs are more fly attached to the tubes in a seamless manner to improve the rigidity and strength of the frame.

Another alternative of composite bicycle frame design is the joining of precured composite tubes and lugs is shown in U.S. Pat. Nos. 5,624,519 and 6,270,104 to Nelson et. al. These patents describe manufacturing the single composite tubes and lugs separately, then joining together in a bonding operation.

Another alternative bicycle frame design is known as the monocoque design as shown in U.S. Pat. No. 4,850,607 by Trimble. Here the entire frame is molded as a one piece unit in an attempt to reduce weight by eliminating the redundant overlapping of material using tubes and lugs. It also provides an attractive aerodynamic shape. However, with this design using a large single tube, the area of the thin wall is even greater, and therefore the susceptibility of buckling is even greater also.

It is desired that other components of the bicycle structure have the same features and benefits of the bicycle frame, namely light weight, stiffness, strength, aerodynamics and greater comfort. The front forks are a major element in the bicycle structure because they steer the bicycle and connect to the front wheel. Therefore stiffness and strength are critical. The front forks also contribute considerable aerodynamic drag because of the large frontal area exposed to the direction of travel.

The initial prior art describes composite bicycle forks of being constructed of a single tube, with the primary goals being light weight and greater strength. U.S. Pat. No. 4,828,285 to Foret describes a composite fork with an internal foam core molded as a one piece unit. This compression molding technique using a foam core to consolidate the plies limited the achievement of super light weight.

U.S. Pat. Nos. 5,692,764 and 5,944,932 to Klein describe a composite bicycle fork with an improved stiffness to weight ratio as well as improved strength. This process produces a more efficient fork because it is without a core material and thus lighter in weight. However, there is no mention of improved aerodynamics or improved comfort.

U.S. Pat. No. 6,655,707 describes a composite fork produced by a filament winding method. This is a technique to automate the production process and to use continuous fibers in an attempt to improve the product quality. As with the other composite fork patents previously mentioned, it describes a single tube for each fork leg.

U.S. Pat. No. 6,669,218 to Sinyard, et. al., describes a composite front fork with an intermediate portion in each fork leg which defines a cavity into which an elastomeric damping material is positioned. Again, this is a single tube fork design which has a reinforced cutaway area into which the elastomeric damper is placed. The main purpose of this design is to provide vibration damping to enhance comfort.

U.S. patent application Ser. No. 10/366,760 to Cobb describes a bicycle fork where each fork leg portion is comprised of two legs arranged generally parallel to each other and with a certain distance in between. Each fork leg has an airfoil shaped cross section, and they are separate legs yet fixed to each other using connectors at various locations. Although two legs are used, they are not integrated together. The main purpose of Cobb is to guide the airflow away from the wheel.

It is critical that the bicycle fork be very strong in order to support the weight of the rider, and also to withstand the combination of loads imposed by riding conditions. A bicycle fork which fails in a catastrophic manner can result is serious injury to the rider. Although many of the aforementioned designs claim greater strength, it may not always be true on a consistent basis, because the molding procedure for composite tubular parts is labor intensive, and if there are portions which result in thin wall thicknesses, buckling failures can occur.

The handlebars are another part of the bicycle structure that are exposed to the direction of travel, and therefore should be designed with aerodynamics in mind. In addition and similar to the forks, the handlebars must withstand a multitude of loads without failing. U.S. Pat. No. 5,557,982 to Klein describes a light weight composite bicycle handlebar which has improved stiffness to weight and strength to weight ratios. There is no mention of aerodynamics or comfort features, and the handlebar is produced using a single composite tube.

Another example is U.S. patent application Ser. No. 10/261,531 to Whiting and Hulick which describes a one piece composite handlebar made from a single tube.

Both of the aforementioned composite handlebar designs are also susceptible to thin walled buckling failures because they are designed with single composite tubes.

The seat post is another critical part of the bicycle frame system because it bears the weight of the rider as well as the circumferential stress of clamping to the frame. U.S. Pat. No. 6,213,488 to Filice, et. al., describes a light weight high strength bicycle seat post comprised of a metal tube with an internal composite tube. However, the two tubes in this case are concentric to provide a thicker and stronger wall design.

U.S. Pat. No. 6,848,701 to Sinyard, et. al., describes a composite seat post with a cavity into which an elastomeric material is inserted to damp vibrations. Similar to U.S. Pat. No. 6,669,218, this is primarily a comfort technology and is produced using a single tube design.

There exists a continuing need for an improved bicycle frame design. In this regard, the present invention substantially fulfills this need. The present invention is designed to provide tailored stiffness, greater resiliency, greater impact strength, greater fatigue resistance, greater aerodynamic effects, less vibrations, greater comfort, and improved aesthetics over the current prior art.

The bicycle frame system according to the present invention substantially departs from the conventional concepts and designs of the prior art and in doing so provides an apparatus primarily developed for the purpose of maintaining light weight while providing tailored stiffness, improved resilience, improved strength, improved aerodynamics as well as improved appearance. This combination of benefits and the ability to adjust these constituents has never been achieved before in bicycle frame design.

In view of the foregoing commonality inherent in the known types of bicycle frames of known designs and configurations now present in the prior art, the present invention provides an improved bicycle frame system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The present invention provides a new and improved bicycle frame system which may be easily and efficiently manufactured.

The present invention provides a new and improved bicycle frame system which is of durable and reliable construction.

The present invention provides a new and improved bicycle frame system which is susceptible of a low cost of manufacture with regard to both materials and labor.

The present invention further provides a bicycle frame system that can provide specific stiffness and resiliency combinations to various locations of the frame.

The present invention provides an improved bicycle frame system that has superior strength and fatigue resistance.

The present invention provides an improved bicycle frame system that has improved aerodynamics.

The present invention provides an improved bicycle frame system that can improve the vibration damping characteristics of the frame.

The present invention provides an improved bicycle frame system that has a unique look and improved aesthetics.

Lastly, the present invention provides a new and improved bicycle frame system made with a multiple tube design, where the tubes, which are fused together along much of their lengths, are separated from one another at selected locations to form apertures that act as double opposing arches, providing improved means of adjusting stiffness, resiliency, strength and aerodynamics.

For a better understanding of the invention, reference should be made to the accompanying drawings and descriptive matter in which there are illustrated preferred embodiments of the invention, in which FIG. 1 is a side view of a bicycle constructed in accordance with an embodiment of the present invention;

FIG. 7 is an isometric cut away view of a portion of an alternative embodiment of a down tube;

FIG. 8 is a cross sectional view of the top tube taken along lines 8-8 of FIG. 1;

FIG. 9 is a cross sectional view of the top tube taken along lines 9-9 of FIG. 1;

FIG. 16 is a vertical sectional view of a portion of the top tube, taken in the direction of arrows 16-16 in FIG. 1; and FIGS. 17-18 are perspective views illustrating a process for forming a frame member of two different materials.

The same reference numerals refer to the same parts throughout the various Figures.

Figure 1:
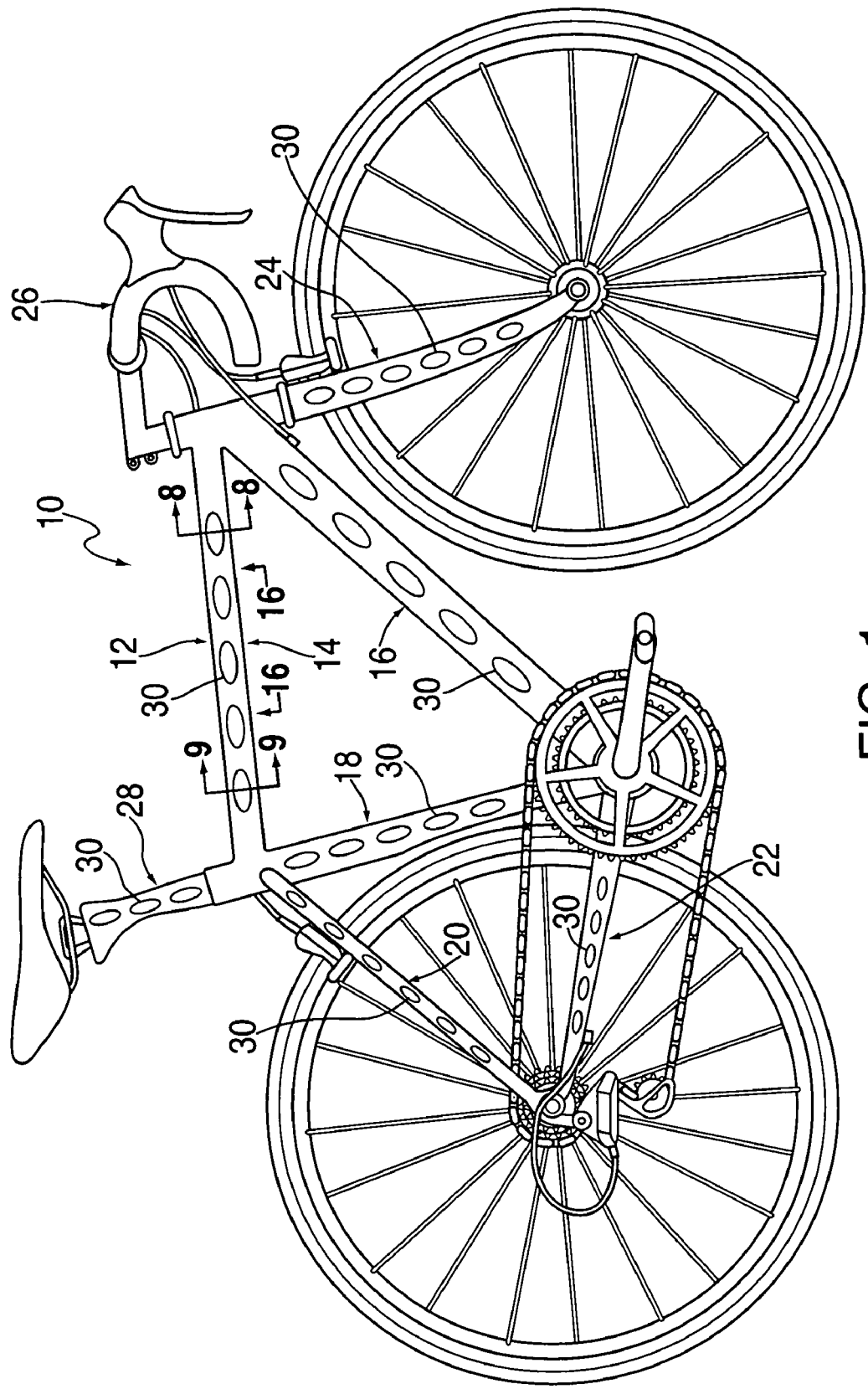

FIG. 1 illustrates a bicycle, which is referred to generally by the reference numeral 10. The bicycle 10 includes a frame 12 which is comprised of a top tube 14, a down tube 16, a seat tube 18, a rear stay 20, and a chain stay 22.

The bicycle frame further includes front forks 24, handlebars 26, and a seat post 28.

FIG. 1 shows one preferred embodiment wherein each of the tubular parts contains openings, or "ports" 30, oriented 90 degrees to the direction of travel. The exception is with the handlebar 26 which has the ports oriented in line to the direction of travel, and are not visible in FIG. 1. However, another handlebar design such as the curved bars used for road bikes will benefit with ports oriented in this manner.

As described below, each of the tubular parts is formed of two or more tubes which are molded together to form a common wall (or walls, in the case of more than two tubes).

However, at selected locations, the facing surfaces of the tubes are kept apart during molding, to form openings. On either side of the openings, the tubes are joined together. The openings so formed are referred to herein as "ports."

FIG. 1 shows the ports 30 oriented primarily for passive suspension purposes, with the axis of the ports generally horizontal and 90 degrees to the direction of travel. Ports oriented in this manner provide the means to achieve more flexibility from each of the tubular members. Thus, the front fork 24 has ports 30 oriented primarily for passive suspension purposes, with the axis of the ports generally horizontal and 90 degrees to the direction of travel. The size and spacing of the ports 30 can vary according to the dimensions of the legs of the fork.

Figure 2:
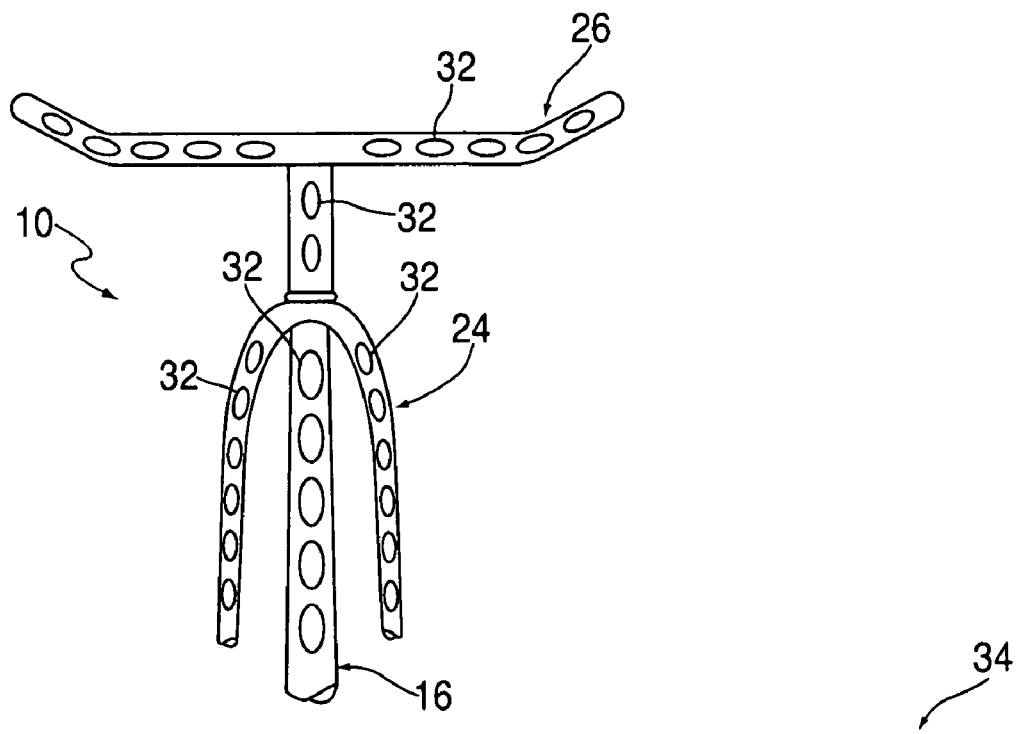
FIG. 2 is a front view of an alternate bicycle frame.

FIG. 2 shows an alternative embodiment, in which the ports 32 are oriented primarily for aerodynamic purposes, with the axis of the ports generally horizontal and parallel to the direction of travel. The handlebar 26, front forks 24, and down tube 16 are the components of the bicycle structure with the greatest frontal area and would therefore reduce the aerodynamic drag the most with ports oriented in this manner. Typically the width of the fork legs 24 are reduced for aerodynamic purposes. With the ported double tube construction, the width of the fork can be greater and still maintain aerodynamic while exceeding the stiffness and strength requirements.

Figure 4:
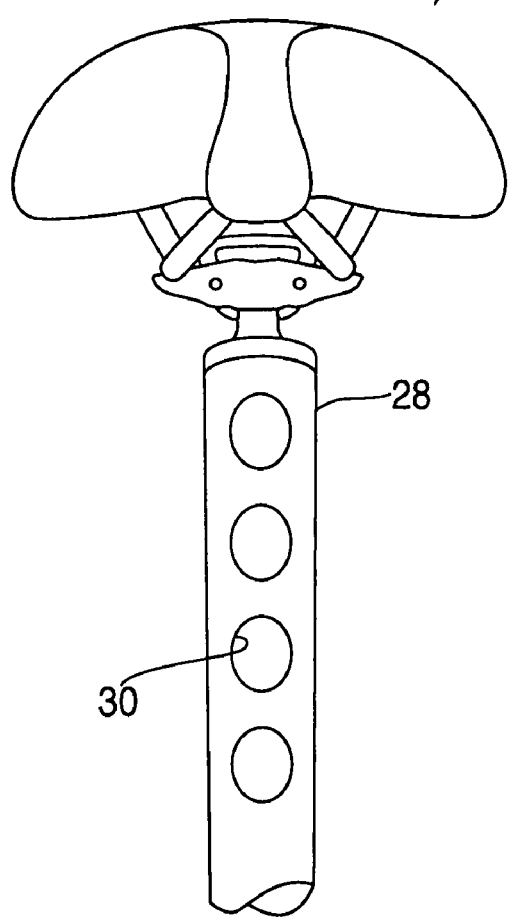
FIG. 4 is a front view of a seat post constructed in accordance with an embodiment of the present invention.

In FIG. 4, the ports of the seat post assembly with seat post 28 are oriented for aerodynamic purposes. The ported double tube design also can provide some passive suspension since the seat post can be somewhat flexible due to the ports. In addition, the internal wall assists in resisting the clamping stress of securing the post to the bicycle frame. This is an excellent application of where a multiple tube construction such as using 4 tubes therefore creating 4 internal walls (see FIGS. 10-12. described below) will better resist the circumferential stress.

In FIG. 2, the ports 32 for the handlebar 26 are oriented for aerodynamic purposes. This is only one example of the many different types of handlebars used on bicycles. This particular example is a utility type handlebar, but there are many different designs and shapes, all of which can benefit from ported double tube or other multi-tube frame members.

Figure 3:
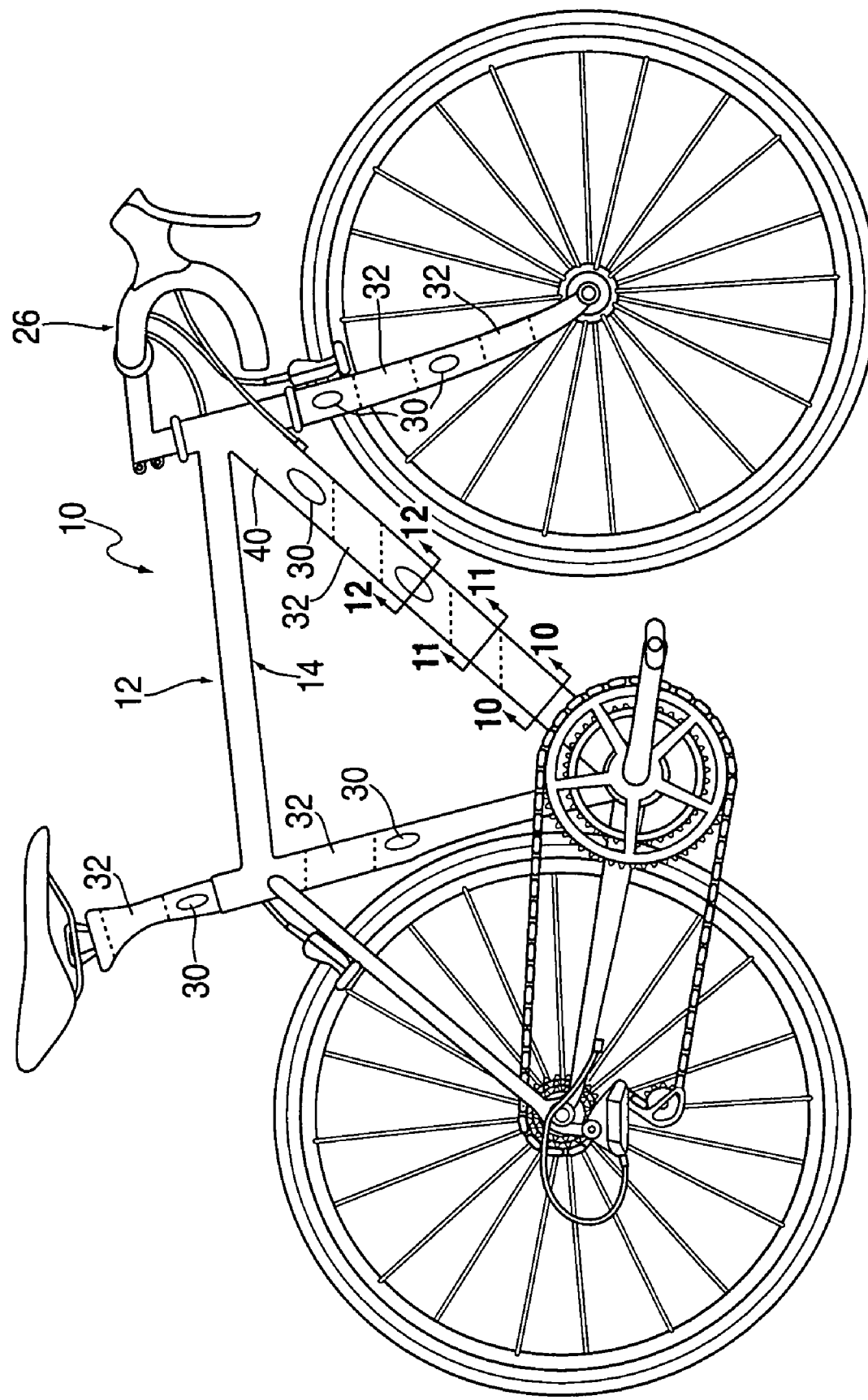
FIG. 3 is a side view of another embodiment of a bicycle.
Figure 5:
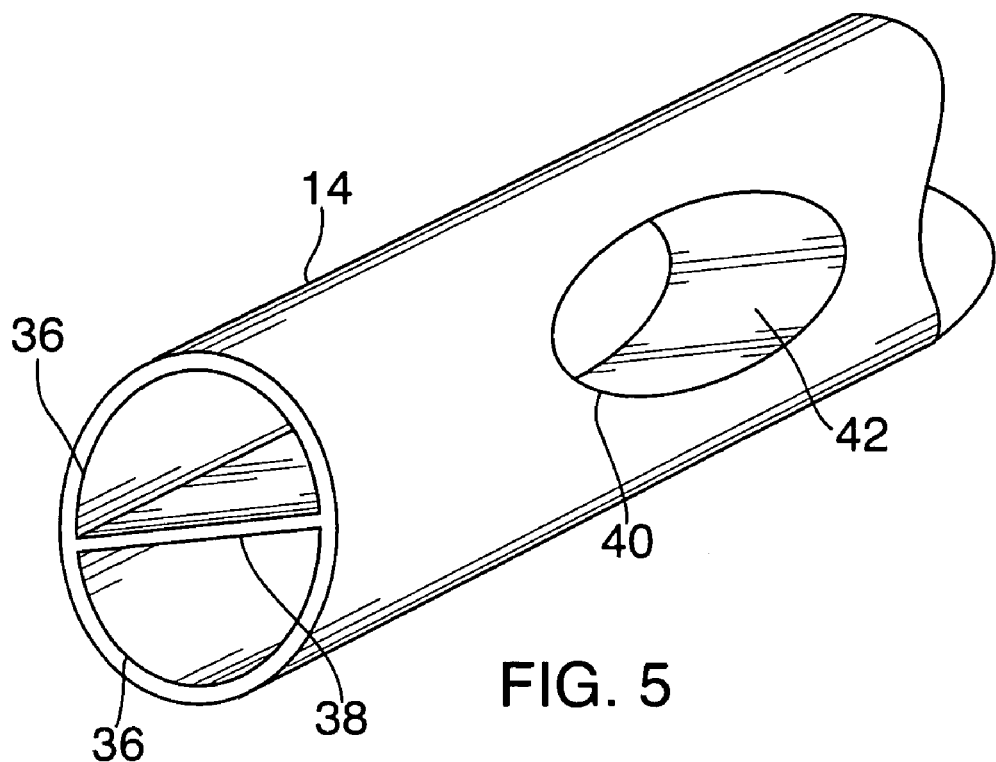
FIG. 5 is isometric cut away view of a portion of the top tube of FIG. 1.

FIG. 3 is a side view of a bicycle 10 with both ports 30 oriented horizontal and perpendicular to the direction of travel and ports 32 oriented parallel to the direction of travel. FIG. 5 is a isometric view of the top tube 14 isolated to one port which shows the two internal tubes 36 and internal wall 38. Also shown is the port 40 and cylindrical wall 42. In this particular example, the axis of the port is 90 degrees to the axis of the tube.

Figure 6:
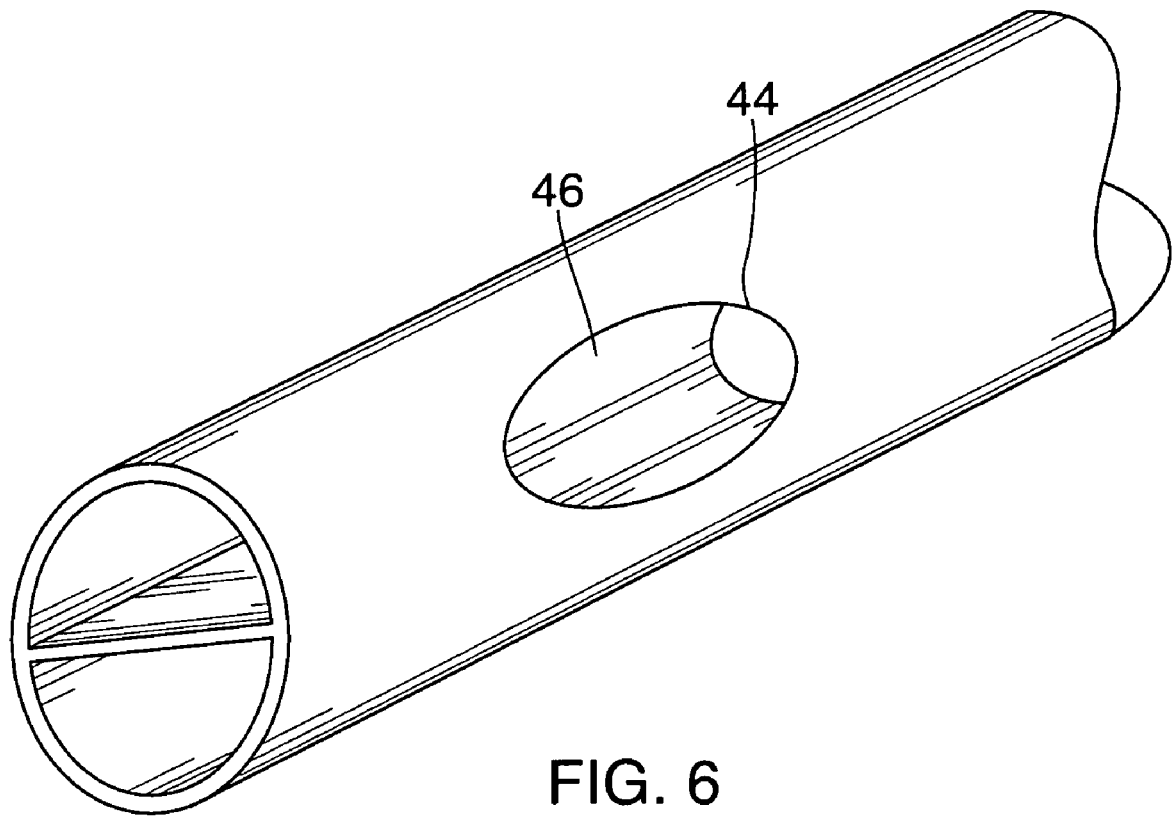
FIG. 6 is an isometric cut away view of a portion of a down tube.

FIG. 6 is an isometric view of the down tube 16 isolated to one port. In this example, the axis of the port 44 is at an acute angle to the down tube so to be parallel to the direction of travel. This results in an elongated internal wall 46.

FIG. 7 is an isometric view of a cutaway portion of the down tube 40 of FIG. 3. In this example, 4 tubes are used to form the structure. As described below in connection with FIGS. 10-12, ports may be formed by separating two tubes from the other two tubes. The FIG. 7 embodiment includes ports 30 oriented perpendicular to the bicycle axis, and ports 32 oriented along the bicycle axis.

With reference to FIG. 8, this cross sectional view along the lines 8-8 of FIG. 1 of the top tube 14 shows the preferred location of the internal wall near the neutral axis of the tubular part. Both of the internal tubes 36 should be about the same size and, when molded, form a "D" shape. The internal tubes 36 are separated from one another at specified locations to form ports 30 as shown in FIG. 9. It is advisable to have a radius (i.e., rounded edges 39) leading into the port so to reduce the stress concentration and to facilitate the molding process.

Figure 10:
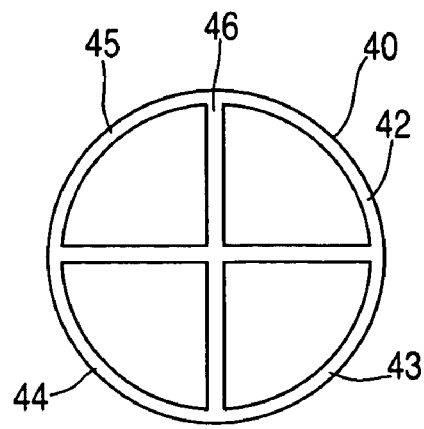
FIG. 10 is a cross section of the down tube in FIG. 4 taken along the lines $10^{-10}$.

FIG. 10 is a cross sectional view of the down tube 40 in FIG. 3. In this example, 4 tubes (42,43,44,45) are used to create the tubular part with creates an internal wall 46 in the form of an "X".

Figure 11:
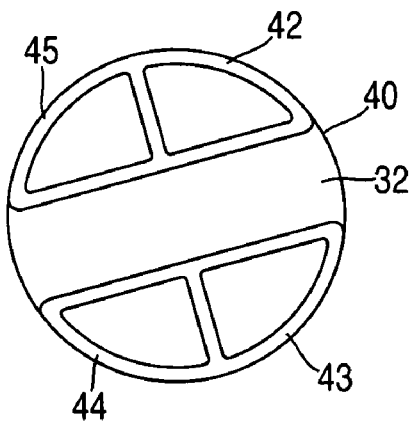
FIG. 11 is a cross section of the down tube in FIG. 4 taken along the lines 11-11.

FIG. 11 is a cross sectional view of the down tube 40 of FIG. 3 in the region of port 32 which is oriented parallel to the direction of travel. In this example internal tubes 42 and 45 have remained together as well as internal tubes 43 and 44.

Figure 12:
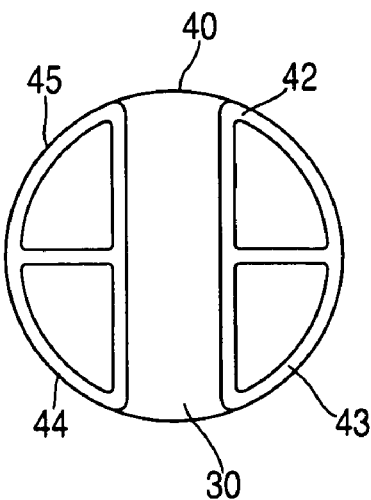
FIG. 12 is a cross section of the down tube in FIG. 4 taken along the lines 12-12.

FIG. 12 is a cross sectional view of the down tube 40 of FIG. 3 in the region of port 30 which is oriented perpendicular to the direction of travel. In this example internal tubes 42 and 43 have remained together as well as internal tubes 44 and 45.

Figure 13:
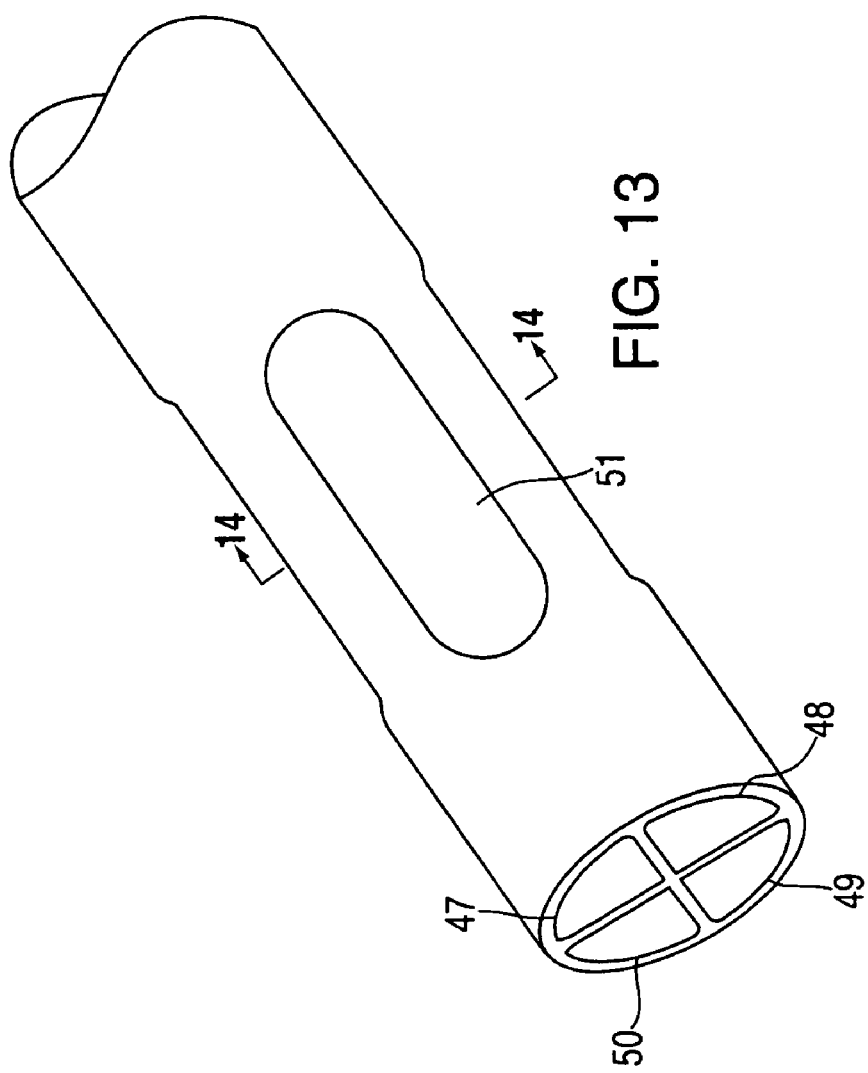
FIG. 13 shows an example of how multiple ports could be oriented in a four tube frame construction.
Figure 15A:
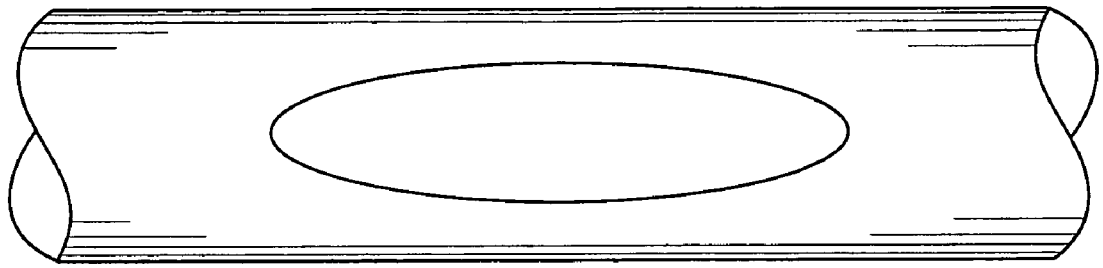
FIG. 15 shows various shapes of ports.
Figure 15B:
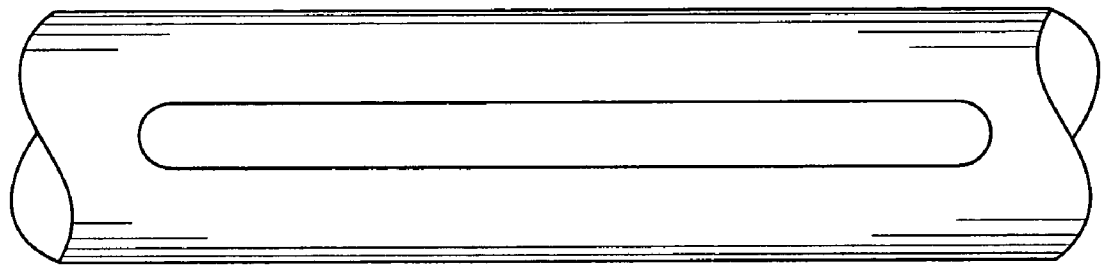
Figure 15C:
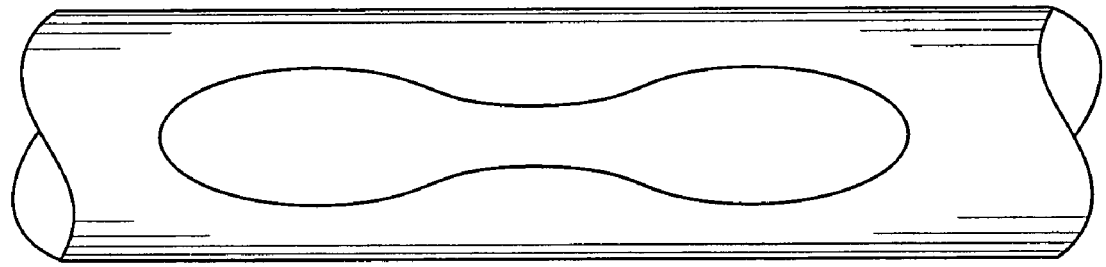
Figure 15D:
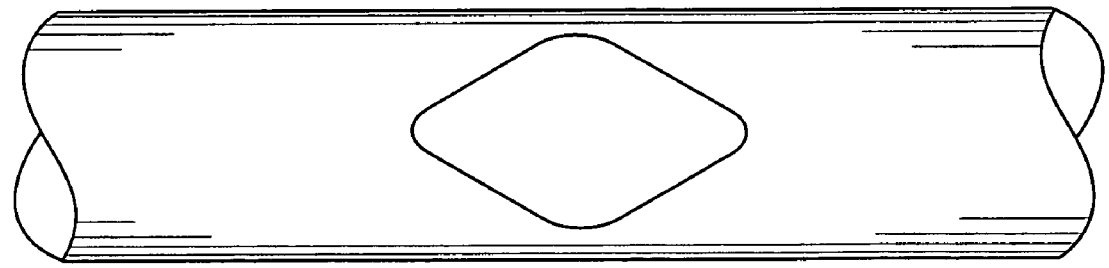

FIG. 13 is an isometric cutaway view of a four tube structure 52 with ports for all tubes located in the same location. In this example, internal tubes 47, 48, 49, and 50 are all separated in the same location to form four ports 51 there between.

Figure 14:
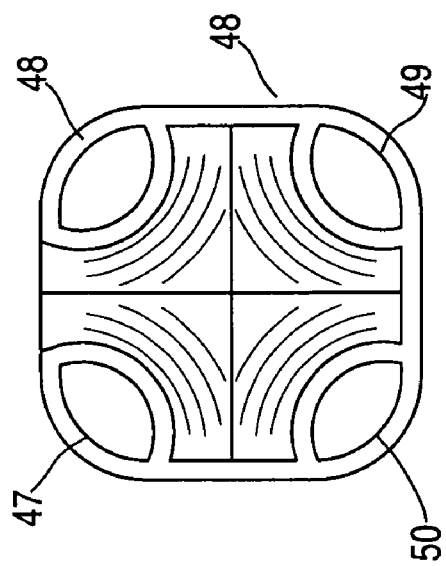
FIG. 14 is a cross sectional view along the lines 14-14 of FIG. 13.

FIG. 14 is a cross sectional view of the tube structure 52 in FIG. 23 taken along the lines L-L. Here it can be seen that because all internal tubes are separated, there results in an open port 52 that is open on four sides.

In a multiple tube design, there can be any number of ports depending on the number of internal tubes used and how many are separated to form these ports.

FIG. 15 illustrates some examples of the variety of shapes possible to be used for the ports. Depending on the performance required of the structure at a particular location, more decorative port shapes can be used.

The preferred embodiments of the present invention use multiple continuous composite tubes which are separated to form apertures in the form of double opposing arches at various locations in the bicycle frame, fork, handlebar, and/or seat post. The basic concept of design and construction can be applied to each of these components because it offers the same advantages, although there exist particularities for each component which will be discussed in more detail separately. For simplicity of discussion, all the above mentioned parts (frame, forks, handlebar, seat post) shall be called "tubular parts" unless they are mentioned specifically by name.

The single, hollow tubular part has been the traditional way to design and manufacture composite bicycle frames. This is because originally, the frame components were produced using single hollow metal tubes, so it was natural to replace these tubes with a single hollow composite tube.

It also makes sense from an efficiency viewpoint, that the single hollow tube maximizes properties of bending and twisting, since the material is displaced away from the central axis of the tube to maximize inertial properties. This has been the traditional bicycle structure.

When a single hollow tube has a sufficient wall thickness, for example when weight is not critical, the design can sufficiently provide adequate stiffness and strength. However, as mentioned previously, when the wall thickness becomes thin relative to the diameter of the tube, the tubular part is susceptible to the wall buckling under the compressive forces which are always present in the bicycle frame.

In accordance with the present invention, conventional single hollow tubes forming the bicycle frame are replaced with multiple tubes joined with an internal wall in between. The internal wall resists deformation of the cross section under loading which resists the buckling of the wall under compressive forces.

As shown in FIG. 16, the tubes, e.g., the tubes 14a, 14b forming the top tube 14, are fused together along much of their lengths to form a common wall 50. At selected locations, e.g., where ports 30 are to be formed, the facing surfaces 15a, 15b of the tubes 14a, 14b are separated during molding to form apertures 30 in the shape of double opposing arches which act as geometric reinforcements to resist deformations and buckling failures.

The invention allows the frame to be custom tuned in terms of its stiffness and resiliency by varying, in addition to the size and shapes of the frame members themselves, the size, number, orientation and spacing of the apertures in the various frame members.

The process of molding with composite materials facilitates the use of multiple tubes in a structure. The most common method of producing a composite tube is to start with a raw material in sheet form known as "prepreg" which are reinforcing fibers impregnated with a thermoset resin such as epoxy. The resin is in a "B Stage" liquid form which can be readily cured with the application of heat and pressure. The fibers can be woven like a fabric, or unidirectional, and are of the variety of high performance reinforcement fibers such as carbon, aramid, glass, etc. The prepreg material commonly comes in a continuous roll or can be drum wound which produces shorter sheet length segments. The prepreg is cut at various angles to achieve the correct fiber orientation, and these strips are typically overlapped and positioned in a "lay-up" which allows them to be rolled up into a tube. A polymer bladder is inserted into the middle of the prepreg tube and is used to generate internal pressure to consolidate the plies upon the application of heat. The premold assembly consisting of the prepreg tube and polymer bladder is positioned into a mold cavity and an air fitting is attached to the bladder.

The mold is pressed closed in a heated platen press and air pressure is applied inside the bladder. As the temperature rises in the mold, the viscosity of the epoxy resin decreases as the bladder expands forcing excess resin to flow outwardly which results in a consolidated part.

To produce a tubular part with multiple prepreg tubes requires a little more labor and an air pressure fitting for each tube. For example when molding the same tubular part using two prepreg tubes, each tube should be approximately half the size of the single tube, and each tube should have its own internal bladder, air fitting and air pressure. The process for packing the mold is very similar except two tubes are packed into the mold and two air fittings attached. Care should be taken for the position of each tube so that the internal wall formed between the tubes is oriented properly. The air pressure for each tube should be applied simultaneously to retain the size and position of each tube and the formed in between. At the epoxy flows and the tubes expand, they will press against each other forming an internal wall that will be well consolidated. The resulting part is extremely strong due to this internal reinforcing wall.

The internal wall of the molded tubular part adds significantly to improving the structural properties of the tubular part. During bending stresses or torsional stresses, the shape of the tubular part is maintained much better, eliminating the deformation of the cross section. To gain a perspective how thin walls are with light weight composite bicycle frames, it is common to be able to deform the tube of some light weight composite bike frame by squeezing the frame with the hand. With the internal wall, the integrity of the tubular part is maintained because as the tube is subjected to bending and twisting, minimal deformation will occur, resulting in a stiffer and stronger structure.

The orientation of the wall can be positioned to take advantage of the anisotropy it offers. If more bending flexibility is desired, the wall can be positioned along the neutral axis of bending. If greater stiffness is needed, then the wall can be positioned like an "I Beam" at 90 degrees to the neutral axis to greatly improve the bending stiffness.

Molding the tubular parts using multiple tubes allows greater design options. Separating the tubes at selected axial locations along the tubes, in order to mold large oval shaped openings between the tubes, allows the characteristics of the tubes to be varied as desired.

Forming the apertures in the tubular part is done using a special molding process. As described above, the prepreg tubes are packed into the mold cavity and positioned as if to produce a multiple tube part. Pins are then inserted between the tubes which will form the apertures during pressurization. The pins are secured into portions of the mold and are easily removed. The air fittings are attached to each prepreg tube and the mold is closed and placed in a heated platen press. Air pressure is applied inside the tubes, and they expand and form around the pins until expansion is complete and the epoxy resin is cross linked and cured. The mold is then opened, the pins removed, and the part is removed from the mold.

Molding in of apertures, or ports, at selected locations results in a double opposing arch construction. What is contributing to the structure, is the "double arch effect" of the ports, which are oval in shape creating two opposing arches which allow the tubular part to deflect, while retaining the cross sectional shape of the tube because of the three dimensional wall structure provided by the port. For example, a ported double tube structure has a combination of exterior walls, which are continuous and form the majority of the structure, and ported walls, which are oriented at an angle to the exterior walls, which provide strut like reinforcement to the tubular structure. The cylindrical walls of the ports prevent the cross section of the tube from collapsing, which significantly improves the strength of the structure. The stiffness and resiliency of the ported double tube structure can be adjusted to be greater or less than a standard single hollow tube. This is because of the option of orienting the internal wall between the tubes as well as the size, shape, angle and location of the ports. The ports can be stiff if desired, or resilient allowing more deflection and recovery, or can be designed using different materials or a lay-up of different fiber angles in order to produce the desired performance characteristics of the structure.

The structure can be further refined by using more than two tubes. For example, using three tubes allows for apertures to occur in 120 degree offsets, providing specific stiffness tailoring along those directions. Using four tubes provides the possibility of having apertures at ninety degree angles to each other and alternately located along the length of the tubular part to achieve unique performance and aesthetic levels. Another option is to locate the multiple ports in the same location to achieve more of an open truss design.

Another options is to combine a single composite tube with a multiple tube composite design. In this example, the single composite tube can be a portion of the tubular part and co-molded with the multiple prepreg tubes to produce a lower cost alternative to a 100% carbon composite construction. In particular, an additional shorter length tube or tubes can be attached to the primary single tube in a local zone and create a port in between. In this manner, the additional tube need only be long enough to form the port between it and the primary tube.

Another option is to combine the composite portion with a metal portion. In this example, the metal tube can be a portion of the tubular part and fused or co-molded with the multiple prepreg tubes to produce a lower cost alternative to a 100% carbon composite construction. This can produce a less expensive structure that can still achieve the performance and aesthetic requirements of the product.

Referring to FIGS. 17-18, in order to make this construction, the forward ends 62 of a pair of prepreg tubes 60*a*, 60*b*, each having an inflatable bladder 64, are inserted into one end 65 of a metal tube 66. The unit is placed inside a mold having the same shape of the metal tube 66, at least at the juncture 70 of the prepreg tubes 60*a*, 60*b* and the metal tube 66. A pin or mold member (not shown) is placed between the prepreg tubes 60*a*, 60*b* where a port 30 is to be formed. The mold is then closed and heated, as the bladders 64 are inflated, so that the prepreg tubes assume the shape of the mold, the mold member keeping the facing walls 71*a*, 71*b* apart so as to form the port 30. As shown, the tubes 60*a*, 60*b* will form a common wall at seam 72. After the prepreg tubes have cured, the frame member 74 is removed from the mold, and the mold member or pin is removed, leaving the port 30. In this embodiment, the seam 70 between the graphite portion 60*a*, 60*b* of the frame member 74 and the metal tube portion 66 should be flush.

Yet another option is to construct a double opposing arch structure using 100% metal materials. The preferred method to produce this structure is to start with a metal tube with a "D" shaped cross section. The tube can then be formed with a half arch bend along a portion of its length. A similar operation can be done with another metal tube. The two tube halves can then be attached by fixing the flat sides of the D shaped cross section so that the two half arches oppose each other. The tubes can be welded or bonded together resulting in a structure with an internal reinforcing wall and a double opposing arch shaped aperture.

An alternative method to produce a multiple tube structure out of metal is to start with a metal tube such as aluminum, titanium, steel, or magnesium for example, and deform the tube in local areas to create dimples or craters in the surface of the tube on opposing sides. The centers of these dimples can be removed leaving a circular aperture through the tube. A tubular section can then be positioned through these circular apertures and fixed to the edges of this dimple area of the primary tube using a welding process to create the 3D structure. The result will be a structure with the primary tube being a single hollow tube with other single hollow tubes attached in a transverse manner internal to the primary tube.

The aerodynamic benefit provided by the ports is determined by the size of the ports relative to the size of the tubular part. In comparing the frontal area of a beam or tube which is subjected to an aerodynamic force, such as the down tube or fork or handlebar, it is possible to achieve a reduced frontal area of up to 25%. This is a significant achievement for a bicycle structure, especially considering that stiffness and strength are not compromised, but in fact improved.

The ported double tube construction can also provide more comfort to the rider. As mentioned previously, the stiffness of the tubular part can be optimized to provide greater flexibility if desired. For example on a bicycle frame, the top tube could have ports oriented at 90 degrees to the direction of travel to provide a more flexible tube for enhanced rider comfort. The same could be done for the down tube, or the seat tube, or for the chain stays or seat stays. The front fork is a critical component for determining rider comfort as evidenced by all the suspension technologies available today. A front fork which has ports oriented 90 degrees to the direction of travel has more flexibility and therefore provides greater rider comfort.

Similarly, the same could be done for the handlebar.

Vertical tubular parts such as the seat post and seat tube could also provide greater rider comfort by utilizing ports oriented with horizontal axes to provide improved vertical displacement to absorb shock and vibration.

Another advantage of the invention is vibration damping. Vibrations are damped more effectively with the opposing double arch construction. This is because the movement and displacement of the arches absorbs energy which damps vibrations. As the tubular parts deflect, the shape of the ports can change, allowing a relative movement between the portions of the tube either side of the port. This movement absorbs energy which damps vibrations.

Finally, there is a very distinguished appearance to a bicycle structure made according to the invention. The ports are very visible, and give the tubular part a very light weight and aerodynamic look, which is important in bicycle marketing. The ports can also be painted a different color, to further enhance the signature look of the technology.

There are unlimited combinations of options when considering a double opposing arch structure. The ports can vary by shape, size, location, orientation and quantity. The ports can be used to enhance stiffness, resilience, strength, aerodynamics, comfort and aesthetics. For example in a low stress region, the size of the port can be very large in order to maximize aerodynamics and appearance. If more deflection or resilience is desired, the shape of the aperture can be very long and narrow to allow more flexibility. The ports may also use designer shapes to give the product a stronger appeal.

If more vibration damping is desired, the ports can be oriented and shaped at a particular angle, and constructed using fibers such as aramid or liquid crystal polymer. As the port deforms as a result of frame deflection, its return to shape can be controlled with these viscoelastic materials which will increase vibration damping. Another way to increase vibration damping is to insert an elastomeric material inside the port.

A bicycle frame structure according to the invention can be made a multitude of ways. One option is to manufacture the tubular parts separately and later bond the tubular frame parts to lugs. This can be done using external lugs, or produce a seamless integrated part. This can be done using external lugs with the tubular parts inserted into the lug, or use internal lugs which are inserted into the interior of the tubular parts to produce a seamless integrated part. Another option is to mold the entire frame structure in a one step process to produce a monocoque type design.

The front forks can be produced in a similar manner as described with the double opposing arch frame. The size of the ports can vary according to the size of the fork legs. In addition, the orientation and spacing between the ports can vary according to the performance desired.

The handlebars can also be produced in a similar manner as the frame. The size of the ports can vary according to the size of the handlebar. In addition, the orientation of the ports can vary according to the performance desired. In some cases, it may be preferred to increase the aspect ratio of the ports, creating long ovals to maximize the aerodynamic benefit.

Finally, the seat post can also be produced in a similar manner as the frame. The size, spacing and orientation of the ports can vary according to the size of the post.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A bicycle frame comprising a plurality of tube members, wherein at least one of said tube members is formed of at least two tubes having facing surfaces, wherein each of said tubes has a length and is formed of composite material, wherein said facing surfaces are bonded to one another at least along much of said length of each said tube, thereby to form an internal reinforcing wall, wherein said facing surfaces are separated from one another at selected locations to form ports, and wherein said ports are oriented at least one selected angle relative to a central axis of the tube member.

2. A bicycle frame as defined in claim 1, wherein said ports vary in size.

3. A bicycle frame as defined in claim 1, wherein the ports have an axis therethrough, and wherein the axes of said ports are spaced apart from one another by at least two distances.

4. A bicycle frame as defined in claim 1, wherein said ports have an axis therethrough, and wherein at least two of said ports have different, horizontal axial orientations.

5. A bicycle frame as claimed in claim 1, wherein said at least one tube member comprises a top tube having opposite ends coupled, respectively, to a down tube and a seat tube, and wherein said ports are spaced away from said opposite ends.

6. A bicycle frame as claimed in claim 1, wherein said at least one tube member comprises a seat tube having opposite ends coupled, respectively, to a down tube and a top tube, and wherein said ports are spaced away from said opposite ends.

7. A bicycle frame as claimed in claim 1, wherein said at least one tube member comprises a down tube having opposite ends coupled, respectively, to a top tube and a seat tube, and wherein said ports are spaced away from said opposite ends.

8. A bicycle frame as claimed in claim 1, wherein said at least one tube member comprises a front fork member having opposite ends, wherein one end of said front fork member is coupled to a front wheel, wherein the other end of said front fork member is coupled to a top tube and a down tube, and wherein said ports are spaced away from said opposite ends.

9. A bicycle frame as claimed in claim 1, wherein said at least one tube member comprises a handlebar.

10. A bicycle frame as claimed in claim 1, wherein said at least one tube member comprises a seat post.

11. A bicycle frame as claimed in claim 1, wherein said at least one tube member comprises a rear stay.

12. A bicycle frame as claimed in claim 1, wherein said at least one tube member comprises a chain stay.

13. A bicycle frame as claimed in claim 1, wherein said tube member has a tube axis; wherein each said port has a port axis therethrough which is perpendicular to said tube axis; and wherein at least two of said port axes extend in different directions.

* * * * *